United States Patent [19]

Norris

[11] Patent Number: 4,652,249

[45] Date of Patent: Mar. 24, 1987

[54] CLUTCH FOR A QUILL FEED MECHANISM

[76] Inventor: Jerry D. Norris, Rt. 2, Box 91, Ainsworth, Nebr. 69210

[21] Appl. No.: 714,171

[22] Filed: Mar. 20, 1985

[51] Int. Cl.$^4$ .............................................. F16D 7/02
[52] U.S. Cl. ................................. 464/44; 74/412 TA
[58] Field of Search .............. 74/412 TA; 464/30, 42, 464/43, 44; 192/56 R, 110 R

[56] References Cited

U.S. PATENT DOCUMENTS

| | | | |
|---|---|---|---|
| 804,778 | 11/1905 | Smith | 464/44 |
| 1,373,810 | 4/1921 | Hansen | 464/44 X |
| 1,994,772 | 3/1935 | Landriani | 464/30 X |
| 3,322,369 | 5/1967 | Haenelt, Jr. | 192/110 R X |
| 3,722,644 | 3/1973 | Steinhagen | 192/56 R |
| 3,788,158 | 1/1974 | Firth | 74/412 R |

FOREIGN PATENT DOCUMENTS

| | | | |
|---|---|---|---|
| 468386 | 11/1928 | Fed. Rep. of Germany | 464/44 |
| 2414135 | 10/1975 | Fed. Rep. of Germany | 464/43 |
| 1004628 | 4/1952 | France | 464/44 |
| 46018 | 10/1919 | Sweden | 464/44 |
| 193856 | 3/1967 | U.S.S.R. | 464/44 |

OTHER PUBLICATIONS

Extract from Bridgeport Operation Manual.
Leadwell Turret Milling Machine Operation Manual.
Enco Turret Milling Machine Instruction Manual.

*Primary Examiner*—Stuart S. Levy
*Assistant Examiner*—Daniel P. Stodola
*Attorney, Agent, or Firm*—Kelly, Bauersfeld & Lowry

[57] ABSTRACT

In a milling machine, a quill power feed mechanism is provided an adjustable overload slip clutch capable of feeding the quill completely to a pre-set micrometer quill stop during a drilling or boring operation. The improved slip clutch includes an overload housing which is attached to a driven gear freely rotatable about a quill pinion shaft, and a clutch body attached to the quill pinion shaft. The overload housing has a smooth internal clutch face which interfaces with a corresponding smooth outer clutch face on the clutch body to drive the quill pinion shaft. The force with which the clutch body is passed against the smooth internal clutch face is adjustable to vary the resistance torque on the quill pinion shaft at which the interacting clutch faces will slip and allow the overload housing to rotate independently of the clutch body.

22 Claims, 4 Drawing Figures

CLUTCH FOR A QUILL FEED MECHANISM

BACKGROUND OF THE INVENTION

This invention relates generally to machine power feed mechanisms and, more specifically, to an improved clutch for a quill power feed mechanism of a milling machine which remains engaged throughout the course of drilling or boring operations, but simultaneously prevents undue strain and stress from being imposed on the mechanism.

Designers of machine tools must be concerned with the effects of over-stressing machine component parts. Numerous machines, particularly machine tools, are fitted with trip devices to prevent such undue strain and stress being imposed on a part. In milling machines, trip devices are normally present in the quill feed mechanism so that if the milling cutter or the quill meets any unyielding obstruction, either in its forward or reverse feed, the feed will be arrested until the operator removes the obstruction.

Such trip mechanisms are usually factory installed and designed to disengage the power feed when resistance to the feed exceeds a pre-set value. In most standard milling machines, the quill feed mechanism is provided an overload clutch set at the factory to disengage if the down pressure on the quill exceeds 200 pounds.

Although these factory-set trip devices have served their intended purpose of preventing feed mechanism damage, they have been far from ideal. Often the factory-set disengage pressure of 200 pounds restricts the size of drills which can be used with the power feed. Further, in many cases the 200 pound trip value is excessive for the job being done, and a much lower value would be preferable. Moreover, in precision drilling or boring operations where a micrometer quill stop is utilized to limit the downward travel of the quill, the prior trip devices typically disengage the power feed drive mechanism several thousandths of an inch above the desired depth, requiring manual feed for completion. This disengagement of the quill power feed mechanism, which also occurs each time the quill is raised, often delays the milling operation and increases costs.

Accordingly, there has been a need for an improved clutch for a quill power feed mechanism which enables an operator to adjust the amount of downward quill pressure to the needs of the operation, thereby substantially decreasing the likelihood of machine damage in the case of a miscue. Additionally, there exists a need for a clutch which enables the power mechanism to feed the quill to a positive stop at the exact depth desired when using a micrometer quill stop in precision operations. Further, an improved clutch for a quill power feed mechanism is needed which, in addition to those features noted above, is sturdy, dependable and capable of maintaining the same quill pressure during successive operations to insure the repeatability of depth accuracy. Finally, there exists a significant need for an economical clutch which can be easily installed in standard milling machines, such as Bridgeport-type machines, which slips at the pre-set torque value rather than disengaging, to eliminate the disengage and engage time which slows milling operations. The present invention fulfills these needs and provides other related advantages.

SUMMARY OF THE INVENTION

The present invention resides in an improved clutch for a quill power feed mechanism which is capable of feeding the quill completely to a pre-set micrometer quill stop during a drilling or boring operation, without disengaging and requiring manual feed. The improved clutch comprises generally an overload housing which is freely rotatable about a quill pinion shaft, and a clutch body positioned about a portion of the pinion shaft so that rotation of the clutch body causes an equal rotation of the pinion shaft. The clutch body has a smooth outer clutch face which adjustably interfaces with a corresponding smooth internal clutch face provided by the overload housing to cause the clutch body to be driven by, and rotate with, the overload housing in the absence of significant resistance torque on the quill pinion shaft. When a significant resistance torque is encountered, however, the clutch faces slip past one another rather than disengage, and allow the overload housing to rotate independently of the clutch body.

In a preferred form of the invention, when the improved clutch is adapted for use in a Bridgeport-type milling machine, the overload housing is attached to a worm gear which is freely rotatable about the quill pinion shaft and is driven by a reversable worm. A sleeve is positioned on the quill pinion shaft adjacent the overload housing in a manner permitting axial movement of the sleeve with respect to the pinion shaft while simultaneously disallowing rotation of the pinion shaft independently of the sleeve. The clutch body is positioned over the sleeve so that the clutch body and the sleeve rotate together, and so that the clutch body can move axially with respect to the sleeve. A lock nut is threaded onto the sleeve and is anchored in position by a set screw to provide a support for a spring positioned between the lock nut and the clutch body. This spring acts to constantly urge the clutch body away from the lock nut toward the overload housing.

To selectively vary the pressure between the clutch faces, an adjustment knob shaft is threaded through a portion of the mechanism housing to contact the sleeve and urge it toward the overload housing. The effect of so moving the sleeve is to initially bring the clutch body into contact with the overload housing, and then to compress the spring to increase the pressure between the smooth outer clutch face and the smooth internal clutch face. Further, the pre-set pressure between the clutch faces can be adjusted by the positioning of the lock nut on the sleeve independently of, or in addition to, adjustment of the positioning of the adjustment knob shaft.

A thrust bearing set is provided between the abutting ends of the adjustment knob shaft and the sleeve to permit rotation of the sleeve without disturbing the positioning of the adjustment knob shaft. To provide an economical, high-strength, and long life clutch, the overload housing is formed of a sintered oilite bronze material, and the smooth internal clutch face is shaped as a truncated cone cavity. Accordingly, the clutch body is sized and shaped to correspond with the truncated cone cavity of the overload housing, and is formed of a high-strength, stressproof steel.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
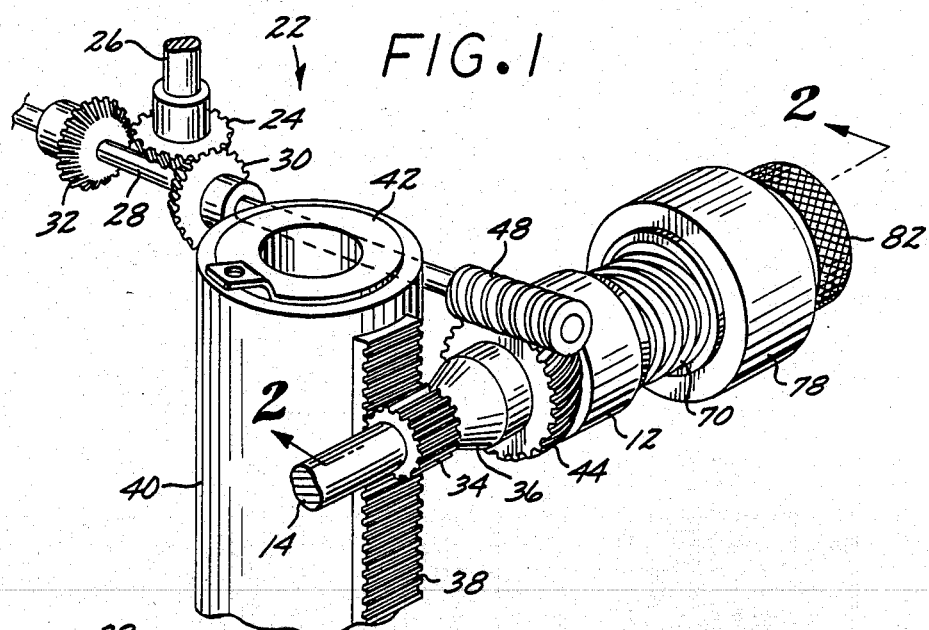
FIG. 1 is a fragmented perspective view of a clutch for a quill power feed mechanism embodying the present invention.
Figure 2:
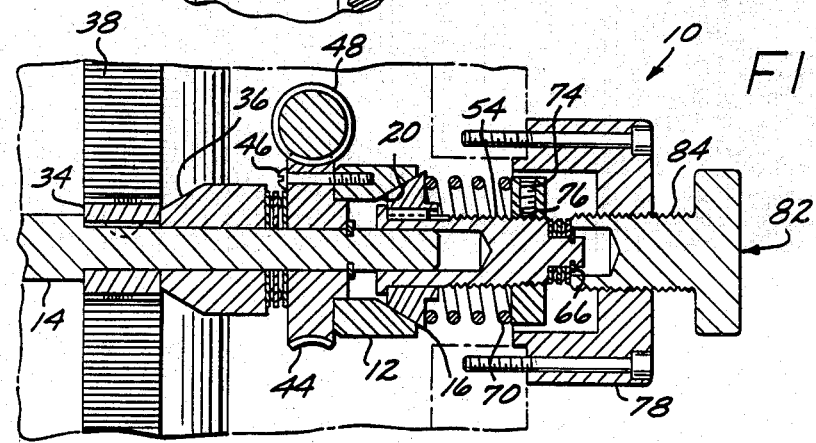
FIG. 2 is an enlarged vertical section taken generally along the line 2—2 of FIG. 1, illustrating the configuration of the feed mechanism clutch components along a quill pinion shaft when adjusted to apply a minimum pressure between an overload housing and a clutch body.
Figure 3:
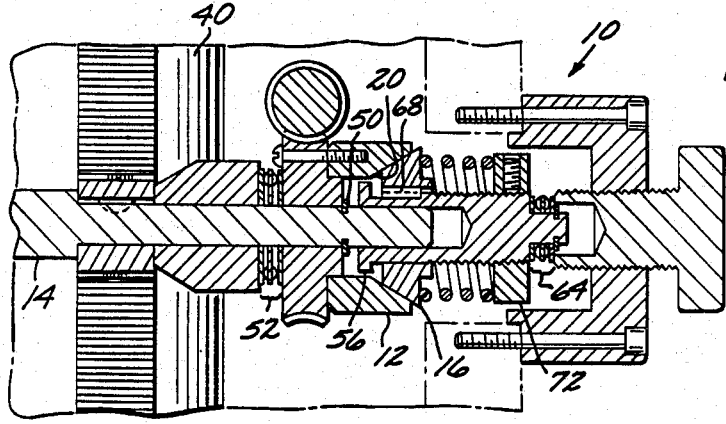
FIG. 3 is an enlarged vertical section taken generally along the line 2—2 of FIG. 1, illustrating the configuration of the feed mechanism clutch components when adjusted to increase the pressure between the overload housing and the clutch body, as compared with the configuration shown in FIG. 2.
Figure 4:
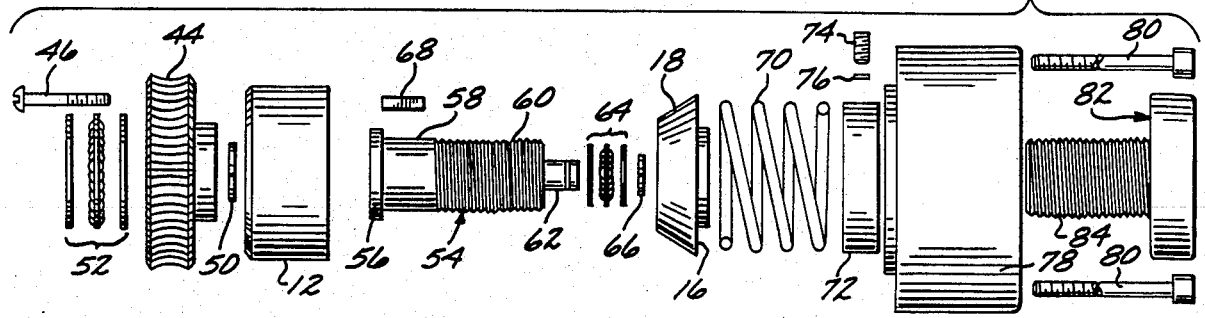
FIG. 4 is an exploded view of the feed mechanism clutch components illustrated in FIGS. 1-3.

As shown in the drawings for purposes of illustration, the present invention is concerned with an improved clutch for a quill power feed mechanism, generally designated in the accompanying drawings by the reference number 10. This improved clutch 10 comprises generally an overload housing 12 which is freely rotatable about a quill pinion shaft 14, and a clutch body 16 positioned about a portion of the pinion shaft so that rotation of the clutch body causes an equal rotation of the pinion shaft. The clutch body 16 has a smooth outer clutch face 18 which adjustably interfaces with a corresponding smooth internal clutch face 20 provided by the overload housing 12 to cause the clutch body to be driven by and rotate with the overload housing in the absence of significant resistance torque on the pinion shaft 14. When a significant resistance torque is encountered, however, the clutch faces 18 and 20 slip past one another rather than disengage, and allow the overload housing 12 to rotate independently of the clutch body 16.

The improved clutch 10 of the present invention advantageously enables an operator to adjust the amount of downward quill pressure to the needs of the milling operation, thereby substantially decreasing the likelihood of machine damage in the case of a miscue. By slipping at a predetermined pressure or torque resistance rather than disengaging, the improved clutch 10 can feed the quill to a positive stop at the exact depth desired when using a micrometer quill stop in precision operations. In addition to being much more convenient than prior trip devices which disengage and require manual feed to complete precision drilling and boring, the improved clutch 10 of the present invention facilitates accurate repeat operations because the uncertainty of manual finishing work is often eliminated. Moreover, milling operations of present machines can be significantly improved by the addition of the improved clutch 10 of the present invention, which can be easily installed on most Bridgeport-type milling machines.

As shown best in FIG. 1, a typical quill power feed mechanism 22 includes a driving straight bevel gear 24 supported by an input shaft 26 which is driven in a known manner by a motor situated in a power feed head (not shown). Immediately below this driving straight bevel gear 24 is a feed worm shaft 28 oriented perpendicular to the input shaft 26. This feed worm shaft 28 rotatably supports a driven straight bevel gear 30 and a reverse driven straight bevel gear 32 spaced from one another on either side of the driving bevel gear 24. The input shaft 26 can be moved in a known manner to selectively cause the driving bevel gear 24 to engage either the driven or reverse driven bevel gear 30 or 32, and cause the feed worm shaft 28 to rotate in the desired direction.

Through the action of the improved clutch 10, rotation of the feed worm shaft 28 is translated to rotation of the quill pinion shaft 14 which rotatably supports a quill pinion 34. The quill pinion 34 is spaced from the clutch 10 by a bushing 36 and engages a quill rack 38 rigidly affixed to the outer surface of a quill 40, shown in FIG. 1 with a felt washer 42 on its upper end. Rotation of the quill pinion 34, which can be additionally effected by turning a manual quill feed lever (not shown) attached to the end of the quill pinion shaft 14 opposite the clutch 10, causes the quill 40 to be raised or lowered, depending on the direction of rotation.

In accordance with the present invention, and as illustrated in FIGS. 1-4, the overload housing 12 is attached to an overload worm gear 44 by means of three round head screws 46. The overload worm gear 44 is positioned on the quill pinion shaft 14 directly below a worm 48 driven by the feed worm shaft 28 in a manner causing the rotation of the worm to be imparted to the worm gear. This worm gear 44 and the attached overload housing 12 are allowd to rotate freely about the quill pinion shaft 14, and are only prevented from moving axially the length of the shaft by a shaft snap ring 50 on one side, and a worm gear thrust bearing set 52 on the other side between the worm gear 44 and the bushing 36. To provide an economical, high-strength and long life clutch 10, the overload housing 12 is preferably formed of a sintered oilite bronze material, and the smooth internal clutch face 20 is shaped as a truncated cone cavity.

A sleeve 54 is provided over the end of the quill pinion shaft 14 adjacent the overload housing 12 in a manner permitting axial movement of the sleeve with respect to that shaft while simultaneously disallowing rotation of the quill pinion shaft independently of the sleeve. Such a relationship can be easily attained by simply allowing the sleeve 54 to move axially with respect to the pinion shaft 14 over a key rigidly positioned in that shaft. The sleeve 54 has an outwardly extending flange 56 on the end closest the overload housing 12, a smooth neck portion 58 adjacent the flange, and a threaded end portion 60 extending from the smooth neck away from the overload housing. Protruding outwardly and generally along the longitudinal axis of the sleeve 54 away from the threaded end portion 60 is a support rod 62 for a sleeve thrust bearing set 64 held in place thereon by a sleeve snap ring 66.

The clutch body 16, which is preferably formed of a high-strength, stressproof steel, is placed over the sleeve neck portion 58 and attached thereto by a sleeve key 68 which prevents the sleeve 54 and clutch body from rotating independently of one another. Notwithstanding this attachment, however, the clutch body 16 is still allowed axial movement with respect to the sleeve 54 in much the same manner that the sleeve is allowed axial movement with respect to the pinion shaft 14. The smooth outer clutch face 18 of the clutch body 16 is oriented to generally face the smooth inner clutch face 20 of the overload housing 12, and the outer clutch face is sized and shaped as a truncated cone to fit within and contiguously contact a large portion of the internal clutch face when the overload housing and clutch body are brought together.

A spring 70 is placed over the sleeve 54, and a lock nut 72 is threaded onto the threaded end portion 60 of the sleeve to hold the spring in compression between the lock nut and the side of the clutch body 16 opposite the outer clutch face 18. This lock nut 72, whose position along the sleeve 54 can be varied to suit the particular needs of a milling operation, is secured at a particular position along the threaded end portion 60 of the sleeve by means of a socket set screw 74 tightened against that threaded end portion through a brass plug buffer 76.

A clutch arm cover 78 forming a portion of the quill feed mechanism housing is secured to the remainder of the milling machine by a pair of cap screws 80. It is through this cover 78 that the quill pinion shaft 14 and other components of the improved clutch 10 are readily accessed. An adjustment knob 82 having a threaded shaft 84 is screwed through a threaded opening in the clutch arm cover 78 to contact the sleeve thrust bearing set 64. The end of the adjustment knob shaft 84 is bored out to insure that only the sleeve thrust bearing set 64 is in contact with that adjustment knob shaft.

In operation, the improved clutch 10 acts to translate rotation of the feed worm shaft 28 into rotation of the quill pinion shaft 14. Such is accomplished when the smooth outer clutch face 18 of the clutch body 16 is brought into contact with the smooth internal clutch face 20 of the overload housing 12 with sufficient force to form a frictional union between the two. Only when the torque resistance on the quill pinion shaft 14 exceeds the force of the frictional union between the clutch faces 18 and 20 will the overload housing 12 rotate independently of the clutch body 16.

A significant feature of the improved clutch 10 of the present invention is the ability to easily vary the force of the frictional union between the clutch faces 18 and 20 to suit the needs of individual operators or the requirements of specific operations. One method of increasing the pressure of the clutch body 16 onto the overload housing 12 is by simply adjusting the positioning of the lock nut 72 on the threaded portion 60 of the sleeve 54. The closer the lock nut 72 is placed to the clutch body 16, the more compressed will be the spring 70, causing a greater force to be placed by the spring on the clutch body.

Another method of increasing the pressure of the clutch body 16 onto the overload housing 12 is to push the sleeve 54 toward the worm gear 44 along the quill pinion shaft 14. This is accomplished by screwing the adjustment knob shaft 84 into the clutch arm cover 78, causing the end thereof to displace the sleeve 54 through its contact with the sleeve thrust bearing set 64. Although when assembling the improved clutch 10 the initial effect of such sleeve 54 movement is only to bring the clutch body 16 into contact with the overload housing 12 (see FIG. 2), further movement compresses the spring 70 in much the same manner as adjusting the positioning of the lock nut 72 (see FIG. 3).

From the foregoing it is to be appreciated that the improved clutch 10 of the present invention saves the operator time by eliminating clutch or trip mechanism disengagement and subsequent re-engagement. Because the clutch faces 18 and 20 simply slip past one another when the resisting torque on the quill pinion shaft 14 exceeds a pre-set and readily adjustable value, the mere removal of the resisting torque permits the power feed mechanism 22 to function as before. An example of an advantage this feature provides over prior trip mechanisms is found in the common task of raising the quill 40 after a cut. With prior mechanisms, even if the clutch had not already disengaged during or after a cut, the raising of the quill in preparation for the next cut would certainly do so. This required the operator to re-engage the clutch for each subsequent cut. In contrast, the improved clutch 10 of the present invention never disengages but rather slips at the pre-set torque setting. After raising the quill 40 of a machine utilizing the improved clutch, it is immediately ready to feed down again for the next cut.

Although a particular embodiment of the invention has been described in detail for purposes of illustration, various modifications may be made without departing from the spirit and scope of the invention. Accordingly, the invention is not to be limited, except as by the appended claims.

I claim:

1. An improved clutch for a quill power feed mechanism, comprising:
    an overload housing being freely rotatable about a quill pinion shaft and having a smooth internal clutch face;
    means for rotatably driving the overload housing about the quill pinion shaft;
    a sleeve positioned on the quill pinion shaft adjacent the overload housing in a manner permitting axial movement of the sleeve with respect to the quill pinion shaft while simultaneously disallowing rotation of the quill pinion shaft independently of the sleeve;
    a clutch body having a complementary smooth outer clutch face of a shape corresponding to the internal clutch face, the clutch body being positioned over the sleeve and attached thereto so that the clutch body and the sleeve are incapable of rotating independently of one another, and so that the clutch body is permitted axial movement with respect to the sleeve;
    means for adjusting the position of the sleeve to place the smooth outer clutch face in contact with the smooth internal clutch face; and
    means disposed on the sleeve for adjusting the clutch body to selectively vary the pressure between the outer clutch face and the internal clutch face for driving the quill pinion shaft in response to rotation of the overload housing, the interaction between the clutch faces allowing the overload housing to slip and rotate independently of the clutch body when the resisting torque of the quill pinion shaft exceeds the driving friction between the clutch faces.

2. An improved clutch, comprising:
    an overload housing being freely rotatable about a shaft and having a smooth internal clutch face;
    means for rotatably driving the overload housing about the shaft;
    a clutch body having a complementary smooth outer clutch face of a shape corresponding to the internal clutch face, the clutch body being positioned over a sleeve so that the clutch body and the sleeve are incapable of rotating independently of one another but the clutch body is permitted axial movement with respect to the sleeve, the sleeve in turn being positioned on the shaft adjacent to the overload housing in a manner permitting axial movement of the sleeve with respect to the shaft while simultaneously disallowing rotation of the shaft independently of the sleeve;

means for adjusting the positioning of the clutch body to place the smooth outer clutch face in contact with the smooth internal clutch face and selectively vary the pressure between the outer clutch face and the internal clutch face for driving the shaft in response to rotation of the overload housing, the adjusting means including an adjustment knob shaft threaded through a portion of a housing for the clutch, the adjustment knob shaft having an end exerting a force on the sleeve to urge it toward the overload housing, the force exerted on the sleeve by the adjustment knob shaft being adjustable by means of an adjustment knob situated externally of the clutch housing, the adjusting means further comprising a lock nut threaded onto the sleeve, and a spring positioned between the clutch body and the lock nut to constantly urge the clutch body away from the lock nut toward the overload housing; and a thrust bearing set provided between the adjustment know shaft and the sleeve to permit rotation of the sleeve without disturbing the positioning of the adjustment knob shaft with respect to the clutch housing.

3. A mechanism as set forth in claim 1, wherein the clutch body adjusting means comprises a lock nut threaded onto the sleeve, and a spring positioned between the clutch body and the lock nut to constantly urge the clutch body away from the lock nut toward the overload housing.

4. A mechanism as set forth in claim 3, wherein the sleeve adjusting means comprises an adjustment knob shaft threaded through a portion of a housing for the quill power feed mechanism, the adjustment knob shaft having an end exerting an axial force on the sleeve to urge it toward the overload housing, the effect of moving the sleeve toward the overload housing being to initially bring the clutch body into contact with the overload housing, and then to compress the spring to increase the pressure between the smooth outer clutch face and the smooth internal clutch face.

5. A mechanism as set forth in claim 4, wherein a thrust bearing set is provided between the adjustment knob shaft and the sleeve to permit rotation of the sleeve without disturbing the positioning of the adjustment knob shaft.

6. A mechanism as set forth in claim 3, wherein the positioning of the lock nut on the sleeve can be adjusted to vary the pre-set compression of the sleeve between the lock nut and the clutch body.

7. A mechanism as set forth in claim 1, wherein the smooth internal clutch face of the overload housing is shaped as a truncated cone cavity.

8. A mechanism as set forth in claim 7, wherein the complementary smooth outer clutch face of the clutch body is sized and shaped to correspond with the truncated cone cavity of the overload housing.

9. A mechanism as set forth in claim 1, wherein the overload housing is formed of a sintered oilite bronze material.

10. A mechanism as set forth in claim 1, wherein the clutch body is formed of a high-strength, stressproof steel.

11. An improved clutch, comprising:
an overload housing being freely rotatable about a shaft and having a smooth internal clutch face;
means for rotatably driving the overload housing about the shaft;
a sleeve positioned on the shaft adjacent to the overload housing in a manner permitting axial movement of the sleeve with respect to the shaft while simultaneously disallowing rotation of the shaft independently of the sleeve;
a clutch body having a complementary smooth outer clutch face of a shape corresponding to the internal clutch face, the clutch body being positioned over the sleeve and attached thereto so that the clutch body and the sleeve are incapable of rotating independently of one another, and so that the clutch body is permitted axial movement with respect to the sleeve;
means for adjusting the position of the sleeve to place the smooth outer clutch face in contact with the smooth internal clutch face; and
means disposed on the sleeve for adjusting the clutch body to selectively vary the pressure between the outer clutch face and the internal clutch face for driving the shaft in response to rotation of the overload housing, the interaction between the clutch faces allowing the overload housing to slip and rotate independently of the clutch body when the resisting torque of the shaft exceeds the driving friction between the clutch faces.

12. A clutch as set forth in claim 11, wherein the clutch body adjusting means comprises a lock nut threaded onto the sleeve, and a spring positioned between the clutch body and the lock nut to constantly urge the clutch body away from the lock nut toward the overload housing.

13. A clutch as set forth in claim 12, wherein the sleeve adjusting means comprises an adjustment knob shaft threaded through a portion of a housing for the clutch, the adjustment knob shaft having an end exerting an axial force on the sleeve to urge it toward the overload housing, the effect of moving the sleeve toward the overload housing being to initially bring the clutch body into contact with the overload housing, and then to compress the spring to increase the pressure between the smooth outer clutch face and the smooth internal clutch face.

14. A clutch as set forth in claim 13, wherein a thrust bearing set is provided between the adjustment knob shaft and the sleeve to permit rotation of the sleeve without disturbing the positioning of the adjustment knob shaft with respect to the clutch housing.

15. A clutch as set forth in claim 11, wherein the overload housing is formed of a sintered oilite bronze material.

16. A clutch as set forth in claim 11, wherein the clutch body is formed of a high-strength, stressproof steel.

17. An improved clutch for a quill power feed mechanism, comprising:
a driven overload gear which is freely rotatable about a quill pinion shaft;
an overload housing securely attached to the overload gear which rotates with the overload gear freely about the quill pinion shaft, the overload housing having a smooth internal clutch face;

a sleeve positioned on the quill pinion shaft adjacent the overload housing in a manner permitting axial movement of the sleeve with respect to the quill pinion shaft while simultaneously disallowing rotation of the quill pinion shaft independently of the sleeve; a clutch body having a smooth outer clutch face with a shape corresponding to the smooth internal clutch face of the overload housing, the clutch body being positioned over the sleeve so that the clutch body and the sleeve are incapable of rotating independently of one another, and so that the clutch body is permitted axial movement with respect to the sleeve;

a lock nut threaded onto the sleeve;

a spring positioned between the clutch body and the lock nut to constantly urge the clutch body away from the lock nut toward the overload housing; and an adjustment knob shaft threaded through a portion of a housing for the quill power feed mechanism, the adjustment knob shaft having one end exerting a force on the sleeve to urge it toward the overload housing, the effect of moving the sleeve toward the overload housing being to initially bring the clutch body into contact with the overload housing and then compress the spring to increase the pressure between the smooth outer clutch face and the smooth internal clutch face.

18. A mechanism as set forth in claim 17, further including means for permitting rotation of the sleeve without disturbing the positioning of the adjustment knob.

19. A mechanism as set forth in claim 17, wherein the smooth outer clutch surface forms a truncated cone.

20. An improved clutch, comprising:

an overload housing being freely rotatable about a shaft and having a smooth internal clutch face;

means for rotatably driving the overload housing about the shaft;

a clutch body having a complementary smooth outer clutch face of a shape corresponding to the internal clutch face, the clutch body being positioned over a sleeve so that the clutch body and the sleeve are incapable of rotating independently of one another but the clutch body is permitted axial movement with respect to the sleeve, the sleeve in turn being positioned on the shaft adjacent to the overload housing in a manner permitting axial movement of the sleeve with respect to the shaft while simultaneously disallowing rotation of the shaft independently of the sleeve;

means for adjusting the positioning of the clutch body to place the smooth outer clutch face in contact with the smooth internal clutch face and selectively vary the pressure between the outer clutch face and the internal clutch face for driving the shaft in response to rotation of the overload housing, the adjusting means including an adjustment knob shaft threaded through a portion of a housing for the clutch, the adjustment knob shaft having an and exerting a force on the sleeve to urge it toward the overload housing, the force exerted on the sleeve by the adjustment knob shaft being adjustable by means of an adjustment knob situated externally of the clutch housing, the adjusting means further comprising a lock nut threaded onto the sleeve, and a spring positioned between the clutch body and the lock nut to constantly urge the clutch body away from the lock nut toward the overload housing; and a thrust bearing set provided between the adjustment knob shaft and the sleeve to permit rotation of the sleeve without disturbing the positioning of the adjustment knob shaft with respect to the clutch housing.

21. A quill power feed mechanism having an improved clutch, the mechanism comprising:

a quill having a quill rack exposed along one side thereof;

a quill pinion shaft having a quill pinion rigidly affixed thereto, the quill pinion shaft being positioned to permit driving engagement between the quill pinion and the quill rack such that on rotation of the quill pinion the quill will be driven linearly along its longitudinal axis depending on the direction of rotation of the quill pinion shaft;

a feed drive shaft for transmitting power from a motor to the quill power feed mechanism, the shaft having a driving gear thereon;

a driven overload gear positioned upon the quill pinion shaft and freely rotatable thereon, the driven overload gear being situated to engage the driving gear;

an overload housing securly attached to the overload gear which rotates with the overload gear freely about the quill pinion shaft, the overload housing having a smooth internal clutch face;

a sleeve positioned on the quill pinion shaft adjacent the overload housing in a manner permitting axial movement of the sleeve with respect to the quill pinion shaft while simultaneously disallowing rotation of the quill pinion shaft independently of the sleeve;

a clutch body having a smooth outer clutch face with a shape corresponding to the smooth internal clutch face of the overload housing, the clutch body being positioned over the sleeve so that the clutch body and the sleeve are incapable of rotating independently of one another, and so that the clutch body is permitted axial movement with respect to the sleeve;

a lock nut threaded onto the sleeve;

a spring positioned between the clutch body and the lock nut to constantly urge the clutch body away from the lock nut toward the overload housing; and an adjustment knob shaft threaded through a portion of a housing for the quill power feed mechanism, the adjustment knob shaft having one end exerting an axial force on the sleeve to urge it toward the overload housing, the effect of moving the sleeve toward the overload housing being to initially bring the clutch body into contact with the overload housing and then compress the spring to increase the pressure between the smooth outer clutch face and the smooth internal clutch face.

22. An improved clutch, comprising:

an overload housing being freely rotatable about a shaft and having a smooth internal clutch face;

means for rotatably driving the overload housing about the shaft;

a sleeve positioned on the shaft adjacent to the overload housing in a manner permitting axial movement of the sleeve with respect to the shaft while simultaneously disallowing rotation of the shaft independently of the sleeve;

a clutch body having a complementary smooth outer clutch face of a shape corresponding to the internal clutch face, the clutch body being positioned over the sleeve and attached thereto so that the clutch body and the sleeve are incapable of rotating independently of one another, and so that the clutch body is permitted axial movement with respect to the sleeve; and means for adjusting the positioning of the clutch body to place the smooth outer clutch face in contact with the smooth internal clutch face and selectively vary the pressure between the outer clutch face and the internal clutch face for driving the shaft in response to rotation of the overload housing, the interaction between the clutch faces allowing the overload housing to slip and rotate independently of the clutch body when the resisting torque of the shaft exceeds the driving friction between the clutch faces as determined by the adjusting means, the adjusting means comprising a lock nut threaded onto the sleeve, and a spring positioned between the clutch body and the lock nut to constantly urge the clutch body away from the lock nut toward the overload housing, the adjusting means further comprising an adjustment knob shaft threaded through a portion of a housing for the clutch, the adjustment knob shaft having an end exerting an axial force on the sleeve to urge it toward the overload housing, the effect of moving the sleeve toward the overload housing being to initially bring the clutch body into contact with the overload housing, and then to compress the spring to increase the pressure between the smooth outer clutch face and the smooth internal clutch face.

* * * * *

UNITED STATES PATENT AND TRADEMARK OFFICE
CERTIFICATE OF CORRECTION

PATENT NO. : 4,652,249

DATED : March 24, 1987

INVENTOR(S) : Jerry D. Norris

It is certified that error appears in the above-identified patent and that said Letters Patent is hereby corrected as shown below:

In the Abstract, line 12, delete "passed" and insert therefor--pressed--.

Delete claim 2 as printed and insert therefor:

--2. A mechanism as set forth in claim 1, wherein the driving means includes an overload worm gear driven by a worm, the worm gear being freely rotatable about the quill pinion shaft and having the overload housing rigidly attached thereto.--

Signed and Sealed this

Eighteenth Day of August, 1987

Attest:

DONALD J. QUIGG

*Attesting Officer*     Commissioner of Patents and Trademarks